(12) United States Patent
Koishi et al.

(10) Patent No.: US 6,611,481 B1
(45) Date of Patent: Aug. 26, 2003

(54) OPTICAL RECORDING/REPRODUCING APPARATUS

(75) Inventors: Kenji Koishi, Sanda (JP); Mamoru Shoji, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/560,678

(22) Filed: Apr. 27, 2000

(30) Foreign Application Priority Data

Apr. 28, 1999 (JP) ............................................ 11-122103

(51) Int. Cl.[7] ................................................. G11B 7/00
(52) U.S. Cl. ................................. 369/47.53; 369/59.11; 369/53.35
(58) Field of Search .......................... 369/53.11, 53.16, 369/53.22, 53.31, 53.35, 53.36, 53.37, 59.11, 59.12, 47.53, 116, 47.5, 47.51, 47.52

(56) References Cited

U.S. PATENT DOCUMENTS

| 5,490,126 | A |   | 2/1996  | Furumiya et al. |         |
|-----------|---|---|---------|-----------------|---------|
| 5,555,537 | A | * | 9/1996  | Imaino et al.   | 369/94  |
| 5,636,194 | A |   | 6/1997  | Furumiya et al. |         |
| 5,663,942 | A |   | 9/1997  | Ishibashi et al.|         |
| 5,802,032 | A | * | 9/1998  | Jacobs et al.   | 369/59.11 |
| 5,956,313 | A | * | 9/1999  | Maegawa et al.  | 369/53.26 |
| 5,978,334 | A | * | 11/1999 | Eastman et al.  | 369/53.27 |
| 6,192,017 | B1| * | 2/2001  | Kimura et al.   | 369/59.11 |
| 6,205,102 | B1| * | 3/2001  | Spruit          | 369/59.11 |
| 6,285,647 | B1| * | 9/2001  | Van Woudenberg et al. | 369/116 |
| 6,490,302 | B1| * | 12/2002 | Koishi et al.   | 372/38.02 |

FOREIGN PATENT DOCUMENTS

JP          9-167346          6/1997

* cited by examiner

Primary Examiner—Thang V. Tran
Assistant Examiner—Bach Vuong
(74) Attorney, Agent, or Firm—Akin, Gump, Strauss, Hauer & Feld, L.L.P.

(57) ABSTRACT

An optical recording/reproducing apparatus forms multiple marks with nine mutually different lengths, which are represented as 3T through 11T according to an eight-to-sixteen modulation coding technique, in an information layer of a rewritable information carrier by irradiating the information layer with a pulsed radiation beam. A test mark with a length equal to or greater than 7T is once recorded in the information layer, a signal associated with the test mark is read out and then an average power of the pulsed radiation beam is corrected to uniformize the widths of marks with various lengths of 7T more. This correction may be performed by partially increasing the power of the radiation beam represented as a multi-pulse train.

27 Claims, 12 Drawing Sheets

FIG.2(a) Write pulses
FIG.2(b) Mark recorded
FIG.2(c) Read signal
FIG.2(d) Binary data

PRIOR ART

FIG. 4(a) Write pulses
FIG. 4(b) Mark recorded
FIG. 4(c) Read signal
FIG. 4(d) Binary data

OPTICAL RECORDING/REPRODUCING APPARATUS

BACKGROUND OF THE INVENTION

The present invention relates generally to an apparatus for writing information to an optical recording medium, like an optical disk, by a mark edge method, more particularly, the present invention relates to an optical recording/reproducing apparatus that can record a mark on a recording medium by irradiating the recording medium with a pulsed laser radiation beam and read the information stored on the recording medium while maintaining the proper definition of, or without narrowing the middle portion of, the mark even if the recording medium exhibits a low recording sensitivity.

Examples of known recording mediums storing optically rewritable information thereon include phase-change storage media and magneto-optical recording media. In writing information onto a phase-change storage medium, an information layer of the medium is irradiated with a focused laser beam, thereby partially heating and fusing the information layer. The highest temperature the information layer can reach due to the heat applied thereto or the cooling process of the layer differs depending on the intensity of the laser radiation incident thereto. Thus, the optical characteristics of the information layer, such as the refractive index thereof, are locally modifiable by modulating the intensity of the laser radiation emitted. More specifically, if the intensity of the laser radiation is higher than a predetermined reference level, part of the information layer of the recording medium that has been irradiated with the radiation is rapidly cooled from an elevated temperature so as to be amorphized. If the intensity of the laser radiation is relatively low on the other hand, the irradiated part of the information layer of the recording medium is gradually cooled from an intermediate to high temperature and therefore crystallized. The amorphized part of the information layer of the recording medium is called a "mark", while the crystallized part is called a "space". That is to say, the mark and space have mutually different optical characteristics in terms of their refractive indices, for example. Accordingly, binary data is storable in the information layer of the recording medium by arranging the marks and spaces in a specific pattern. As used herein, the laser radiation for use in information recording will be called "write radiation".

In reading out information stored on a phase-change storage medium, the information layer thereof is irradiated with a laser radiation beam with an intensity low enough to not cause any phase change in the information layer and a radiation beam, which is reflected from the information layer, is detected. As used herein, the laser radiation for use in information readout will be called "readout radiation". The mark, or the amorphized part of the information layer of the recording medium, has a relatively low reflectance, while the space, or the crystallized part of the information layer of the recording medium, has a relatively high reflectance. Accordingly, by recognizing the difference in the amount of the radiation reflected from the mark and space, a read signal can be obtained.

Information can be recorded on such a recording medium by a pulse position modulation (PPM) or pulse width modulation (PWM) technique. A recording technique which uses PWM is also called a "mark edge recording" technique.

According to the PPM recording technique, marks are recorded with the space between the marks varied, and information to be written is assigned to positions of the marks. Each of these marks is represented as a pulse with a relatively short, constant pulse width. In contrast, according to the PWM technique, marks of various lengths are recorded with the space between the marks also varied, and information to be written is represented by edge positions of the marks and spaces with a variety of lengths. Generally speaking, the density of the information recorded can be higher with the PWM technique than with the PPM technique.

In performing a PWM recording, longer marks are recorded compared to the PPM recording. If long marks are recorded on a phase-change storage medium, however, the widths of those marks might be non-uniform, because the information layers of media of this type may accumulate and dissipate heat in various manners and their recording sensitivities may be greatly different from each other. It is also known that if the information layer is continuously irradiated with radiation for a long time to record a long mark therein, then the second half of the long mark is likely to increase its width because too much heat is accumulated in that part. To avoid such an unfavorable increase in mark width, a write strategy, by which the radiation is irradiated for recording purposes as a greater number of pulses each with an even short width, was adopted. Methods and apparatuses of this type, that is to say, multi-pulse mark recording methods and apparatuses, are disclosed in U.S. Pat. Nos. 5,490,126 and 5,636,194, for example.

FIG. 2(a), FIG. 2(b), FIG. 2(c) and FIG. 2(d) illustrate waveforms of write radiation, shapes of marks formed in the information layer, waveforms of read signals and binary data obtained by digitizing the read signals, respectively. It should be noted that the waveform of write radiation is defined by the waveform of an electrical signal used for modulating the write radiation. As used herein, the electrical signal will be regarded as a collection of "write pulses". The power of the write radiation (hereinafter, simply referred to as "write power") is proportional to the amplitude of a write pulse. Depending on the type of a radiation source (e.g., semiconductor laser diode), a non-essential difference may be found between the waveform of write radiation and the waveform made up of write pulses. In this specification, however, the waveforms of the write radiation and write pulses will not be strictly distinguished from each other.

First, referring to FIG. 2(a), the waveform of the write radiation used for forming a single mark consists of a first pulse 1, a multi-pulse train 2 and a second pulse 3, which appear one after another in this order on the time axis. The write power is modulated among peak power Pp, bias power 1 Pb1 and bias power 2 Pb2. It should be noted that although the term "multi-pulse train" generally means a train made up of at least two pulses, just one pulse located between the first and second pulses will also be labeled as such in this specification for convenience sake.

In an interval during which a single mark is being formed in the information layer by irradiating the information layer of the recording medium with the write radiation, the write power is modulated between the peak power Pp and the bias power 2 Pb2. As used herein, this interval will be called a "marking period". On the other hand, in an interval during which a single space is being formed in the information layer of the recording medium, the write power is maintained at the bias power 1 Pb1. As used herein, this interval will be called a "spacing period".

In general, an optical recording/reproducing apparatus has to write or read information appropriately onto/from an optical information carrier with various recording properties. Thus, if information is written on an information carrier with a relatively low recording sensitivity while keeping an average write power (i.e., an average of the write power during the marking period) constant, then the lengths and widths of marks formed in such a carrier tend to be smaller. Accordingly, after having initialized the write power of a radiation source at an appropriate value while taking the recording sensitivity of an information carrier into account, a conventional optical recording/reproducing apparatus compensates for the write power to adaptively change the lengths and widths of marks to be formed. This process is called "write power learning". More specifically, such an optical recording/reproducing apparatus compensates for the write power by recording a relatively short mark on the information carrier for testing purposes and then modulating the write power such that the short mark can be recorded accurately. This strategy has been adopted because it has been more important than anything else to record a short mark resulting in a read signal with small amplitude.

However, a read error is still unavoidable even if the write power is compensated for by the conventional technique. Also, a relatively long mark is more likely to cause such a read error.

An exemplary mark 4 is illustrated on the left-hand side of FIG. 2(b). Such a mark 4 is formed if the thermal energy (or the average power applied by the write radiation during the marking period) associated with the multi-pulse train 2 is less than a minimum required level. As shown in FIG. 2(b), the mark 4 is relatively wide at its front and rear edges but is relatively narrow in its middle portion between the edges. A to mark recorded by the conventional technique results in this unfavorable phenomenon, hereafter referred to as "middle narrowing".

If such a mark 4 is irradiated with readout radiation, and the radiation reflected from the mark 4 is typically received at a photodetector and converted into an electrical is signal, then a read signal 5 with twin peaks is obtained as illustrated on the left-hand side of FIG. 2(c). And if the read signal 5 is digitized with respect to its threshold value 6, then two discrete pulses 7 and 8 are formed as illustrated on the left-hand side of FIG. 2(d). As a result, neither the precise locations of the edges of the mark 4 nor the length of the mark 4 can be recognized correctly, thus causing an error in reading the recorded data from the recording medium.

The middle portion of a mark, i.e., part of a mark located between its front and rear edges, where the level of the associated read signal is relatively low and which will be erroneously recognized as a "space", not "part of the mark", when the read signal is digitized, will be hereafter referred to as a "read-error-inducing portion".

Even in the conventional optical recording/reproducing apparatus, if an increase in number of read errors is sensed by a system controller in the apparatus during the process of compensating for the write power, then the write power is automatically adjusted in such a manner as to reduce the read errors. The conventional compensation technique is illustrated on the right-hand side of FIG. 2(a)–(d). According to the conventional write power compensation technique, the power level of each pulse in the write radiation is increased by the factor of $\alpha$ (where $\alpha>1$), thereby irradiating an optical information carrier with the write radiation with the waveform shown on the right-hand side of FIG. 2(a), where $Pp'=\alpha \times Pp$, $Pb1'=\alpha \times Pb1$ and $Pb2'=\alpha \times Pb2$. However, if all of these three power levels are increased by the same factor, then a resultant mark 10 will be much longer and wider than a desired mark 9 as shown on the right-hand side of FIG. 2(b). Thus, such an excessively long and wide mark 10 will result in a read signal 12 with a waveform laterally expanded compared to a desired read signal 11 as shown on the right-hand side of FIG. 2(c). And if that read signal 12 is digitized with respect to its threshold value 6, then a mark length 14, which is represented by the width of a pulse of the binary data obtained, is longer than its appropriate length 13 as illustrated on the right-hand side of FIG. 2(d). As a result, neither the locations of the edges of the mark 9 nor the length of the mark 9 can be recognized correctly, thus also causing a read error.

It should be noted that such a problem is not unique to a phase-change storage medium but might happen to any other optical information carrier, e.g., a magneto-optical recording medium.

SUMMARY OF THE INVENTION

The invention provides an optical recording/reproducing apparatus that can further improve the conventional write power compensation, accurately determine whether or not a relatively long mark will have a narrowed middle portion and correct the write power to form the long mark in its desired shape.

An inventive apparatus forms multiple marks with nine mutually different lengths, which are represented as 3T through 11T according to an eight-to-sixteen modulation coding technique, in an information layer of a rewritable recording medium by irradiating the information layer with a pulsed radiation beam. A test mark with a length equal to or greater than 7T is once recorded in the information layer, a signal associated with the test mark is read out and then an average of power, which is applied to marks with various lengths equal to or greater than 7T, is changed for part of each said mark to uniformize the widths of the marks.

Another inventive apparatus also forms multiple marks, which are associated with information to be written, in an information layer of a recording medium by irradiating the information layer with a pulsed radiation beam such that optical characteristics of the information layer are locally changed. The apparatus includes: information write means for generating write pulses in forming each said mark and for modulating the radiation beam with the write pulses; information readout means for sensing a variation in the optical characteristics of respective parts of the information layer where the marks have been formed; and a long mark data generator for getting at least one test mark written in the information layer by the information write means. The length of the test mark is equal to or greater than a preselected length. The apparatus further includes a mark width comparator for determining whether or not the test mark includes a read-error-inducing portion in which the optical characteristics have not changed sufficiently for reading out a signal associated with the test mark correctly. If there is a read-error-inducing portion in the test mark, an average power of the radiation beam is increased from an initialized level in forming a mark with a length at least equal to that of the test mark, thereby correcting the power in such a manner as to eliminate the read-error-inducing portion from the mark.

In one embodiment of the present invention, the power is preferably corrected by partially increasing the average power of the radiation beam for a middle portion of a mark to be formed.

Still another inventive apparatus also forms multiple marks, which are associated with information to be written, in an information layer of a recording medium by irradiating the information layer with a pulsed radiation beam such that optical characteristics of the information layer are locally changed. The apparatus performs a test recording operation. The operation includes the steps of: a) writing at least one test mark in the information layer, the length of the test mark being equal to or greater than a preselected length; b) sensing a variation in the optical characteristics of part of the information layer where the test mark has been formed; and c) determining whether or not the test mark includes a read-error-inducing portion in which the optical characteristics have not changed sufficiently for reading out a signal associated with the test mark correctly. If it has been determined in the step c) that there is a read-error-inducing portion in the test mark, an average power of the radiation beam is increased from an initialized level in forming a mark with a length at least equal to that of the test mark.

Yet another inventive apparatus forms multiple marks, which are associated with information to be written, in an information layer of a recording medium by irradiating the information layer with a pulsed radiation beam such that optical characteristics of the information layer are locally changed. The apparatus includes: a memory where information defining a pulse train, which will drive a source of the radiation beam, is stored; a write circuit for generating the pulse train in accordance with the information stored on the memory; a read circuit for reading out data associated with the marks that have been formed in the information layer; and a controller, connected to the write and read circuits, for controlling write and read operations. The controller is programmed in such a manner as to perform the write and read operations for a mark with a length equal to or greater than a preselected length and to update the information stored on the memory such that the pulse train is optimized for the mark with the length.

BRIEF DESCRIPTION OF THE SEVERAL VIEWS OF THE DRAWINGS

The foregoing summary as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 2(a) illustrates the waveforms composed of write pulses; FIG. 2(b) illustrates the shapes of marks formed in an information layer; FIG. 2(c) illustrates the waveforms of read signals; and FIG. 2(d) illustrates the waveforms of binary data derived from the read signals;

FIG. 3(a) illustrates the waveforms composed of write pulses; FIG. 3(b) illustrates the shapes of marks formed in an information layer; FIG. 3(c) illustrates the waveforms of read signals; and FIG. 3(d) illustrates the waveforms of binary data derived from the read signals;

FIG. 4(a) illustrates the waveforms composed of write pulses; FIG. 4(b) illustrates the shapes of marks formed in an information layer; FIG. 4(c) illustrates the waveforms of read signals; and FIG. 4(d) illustrates the waveforms of binary data derived from the read signals;

DETAILED DESCRIPTION OF THE INVENTION

Hereinafter, preferred embodiments of the inventive optical recording/reproducing apparatus will be described with reference to the accompanying drawings.

Figure 3:
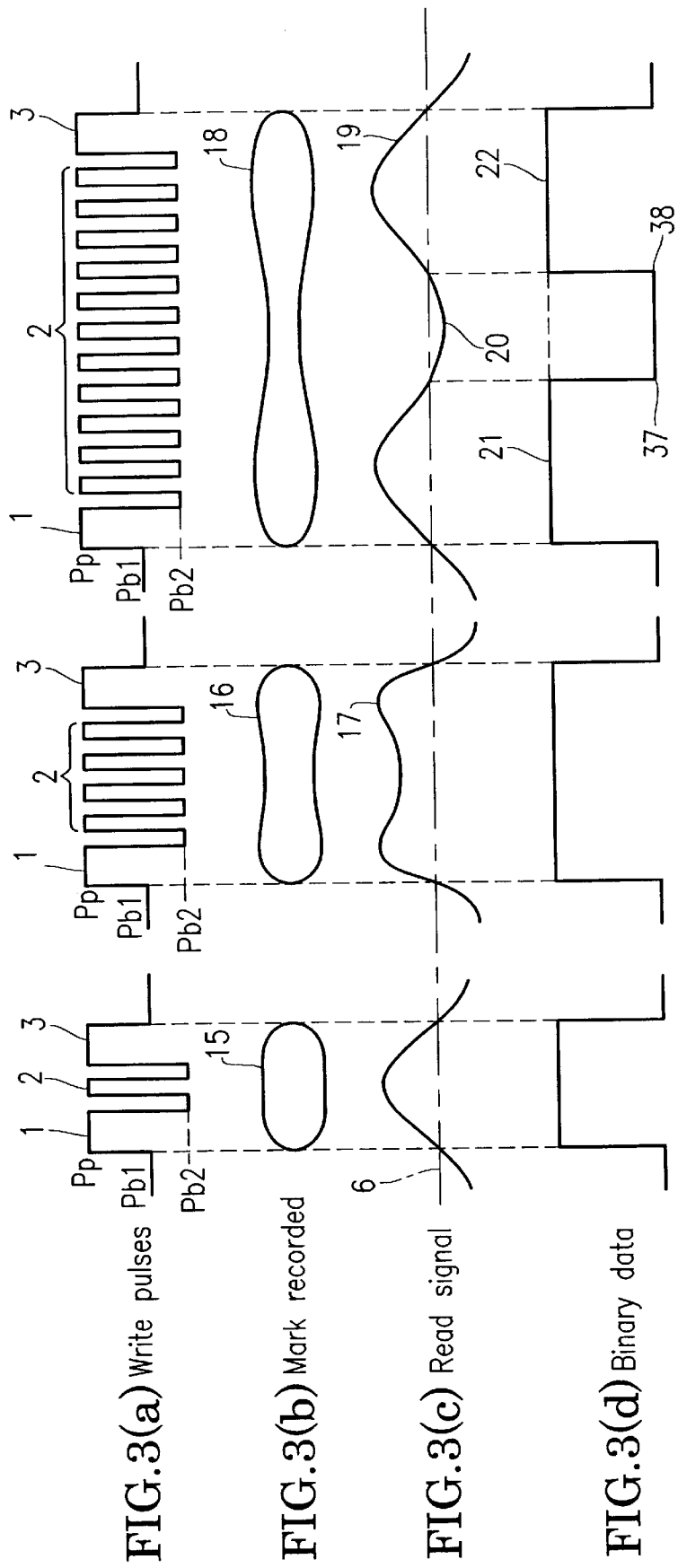
FIGS. 3(a)–(d) illustrate relations between shapes of marks and signal waveforms observed before an optical recording/reproducing apparatus corrects the write power.

FIG. 3(a) illustrates the waveforms of write radiation used for forming three types of marks with mutually different lengths, i.e., the waveforms of write pulses. Each write radiation is represented as a set of pulses, which include a first pulse 1, a multi-pulse train 2 and a second pulse 3.

As illustrated in FIG. 3(a), the power of the write radiation is modulated among peak power Pp, bias power 1 Pb1 and bias power 2 Pb2, where Pp>Pb1>2 Pb2. The power values Pp, Pb1 and Pb2 may be set to 10, 6 and 2 mW, respectively.

In the illustrated embodiment, the write power is modulated between the peak power Pp and the bias power 2 Pb2 in an interval during which each mark is being formed in the information layer (i.e., "marking period") of the recording medium. On the other hand, in an interval during which each space is being formed in the information layer (i.e., "spacing period") of the recording medium, the write power is maintained at the bias power 1 Pb1.

According to the write strategy adopted in the illustrated embodiment, the pulse widths of the first and second pulses 1 and 3 are set broader than that of each pulse included in the multi-pulse train 2. Thus, the average energy applied by the multi-pulse train 2 to the information layer is lower than that applied by the first or second pulse 1 or 3 to the information layer. Typical pulse widths of the first and second pulses 1 and 3 are in the range from 1.0T to 1.5T, while a typical pulse width of each pulse included in the multi-pulse train 2 is in the range from 0.4T to 0.6T. T is a period of a channel clock signal and corresponds to the length of a signal of one bit.

The average energy applied by the multi-pulse train 2 to the information layer (i.e., average write power during the marking period) depends heavily on a duty cycle of the multi-pulse train 2. As used herein, the duty cycle of the multi-pulse train 2 is defined as a ratio of the width of each pulse to the period of the pulse train. If the multi-pulse train 2 consists of a single short pulse, the duty cycle thereof is defined as a ratio of the width of the single pulse to an interval between the first and second pulses. In the illustrated embodiment, the pulse amplitude of the multi-pulse train 2 is equal to that of the first and second pulses 1 and 3. Accordingly, when the duty cycle of the multi-pulse train 2 is 50%, for example, the average energy applied by the multi-pulse train 2 is half of the average energy applied by the first or second pulse 1 or 3.

If the information layer of the recording medium is irradiated with such write radiation, then the information layer heats rapidly due to the energy applied by the first pulse 1 and then the temperature tends to fall in an interval during which the radiation is irradiated by the multi-pulse train 2. And if the temperature of the information layer has cooled considerably, then insufficient phase change results in the information layer.

FIG. 3(b) illustrates the planar shapes of the three types of marks formed in the information layer of an optical disk. As can be seen from FIG. 3(b), the longer a mark, the narrower the middle portion of the mark tends to be. The relatively short mark 15 shown on the left-hand side of FIG. 3(b) is less likely to reduce its width in the middle portion, because the radiation represented as the multi-pulse train 2 is irradiated for just a short time. As for the long mark 16 shown at the center of FIG. 3(b), however, the average energy of the write radiation starts to diminish in the middle of the irradiation period, because the radiation represented as the multi-pulse train 2 is incident to the recording medium for a longer period of time. As a result, the mark 16 begins to reduce its width in the middle portion. The middle-narrowing phenomenon is much more pronounced in the longest mark 18. This is because the ratio of the interval during which the radiation represented as the multi-pulse train 2 is irradiated to the marking period is much greater than any of the other two cases and the cooling of the information layer of the recording medium extends for a longer period of time.

A mark to be formed changes its length depending on the length of time the write radiation is incident to the recording medium and the linear velocity of the write radiation applied to the recording medium. The middle-narrowing phenomenon of a mark is appreciably pronounced when the mark is double the length of the spot size of a pulsed radiation beam focused on the information layer. In this case, the spot size may be defined as a full width at half maximum of an intensity distribution of the write radiation incident on the information layer of the recording medium.

Next, it will be described with reference to FIG. 3(c) and (d) why a mark with a narrowed middle portion causes an information read error. FIG. 3(c) illustrates the waveforms of read signals associated with the respective marks shown in FIG. 3(b), while FIG. 3(d) illustrated binary data obtained by detecting the levels of the read signals with respect to the threshold values 6. In the illustrated example, the portion of the binary data in the logical "1" state corresponds to the marking period, while the other portion of the binary data in the logical "0" state corresponds to the spacing period.

As shown at the center of FIG. 3(c), a read signal 17 with a waveform including twin peaks is derived from the mark 16 of an intermediate length. However, the level of the read signal 17 is no lower than the threshold value 6 of digitization even in the middle portion of the mark 16. Thus, binary data corresponding to a correct mark length is obtained from the mark 16 as shown at the center of FIG. 3(d).

In contrast, a read signal 19 with a waveform including two steeply rising peaks and a valley 20 in its middle portion is obtained from the mark 18 with a greatly narrowed middle portion as shown on the right-hand side of FIG. 3(c). In this case, the level of the read signal 19 at the valley 20 is lower than the threshold value 6. Accordingly, if such a read signal 19 is digitized with respect to the threshold value 6, then the resultant binary data includes two digital pulses 21 and 22 as shown on the right-hand side of FIG. 3(d). That is to say, the length of the mark 18 cannot be recognized correctly due to the existence of the extra trailing and leading edges 37 and 38 of the digital pulses 21 and 22.

As can be seen, the longer a mark, the narrower its middle portion tends to be. If an optical disk with a good recording sensitivity is used, a long mark does not narrow in width too much at the middle portion and is less likely to cause a read error.

The conventional optical recording/reproducing apparatus also writes a test mark and reads out a signal associated with the test mark in order to optimize the write power. However, the conventional apparatus cannot distinguish an error, which has resulted from such a middle-narrowing phenomenon of a long mark, from errors caused by other factors.

In contrast, according to the present invention, a relatively long test mark is once recorded, and then it is determined by the binary data derived from the test mark whether or not the length of the long test mark is correctly recognizable. In this manner, it is possible to know whether or not an optical disk in question is likely to form a mark with a narrowed middle portion.

I. Optical Recording/reproducing Apparatus

Figure 1:
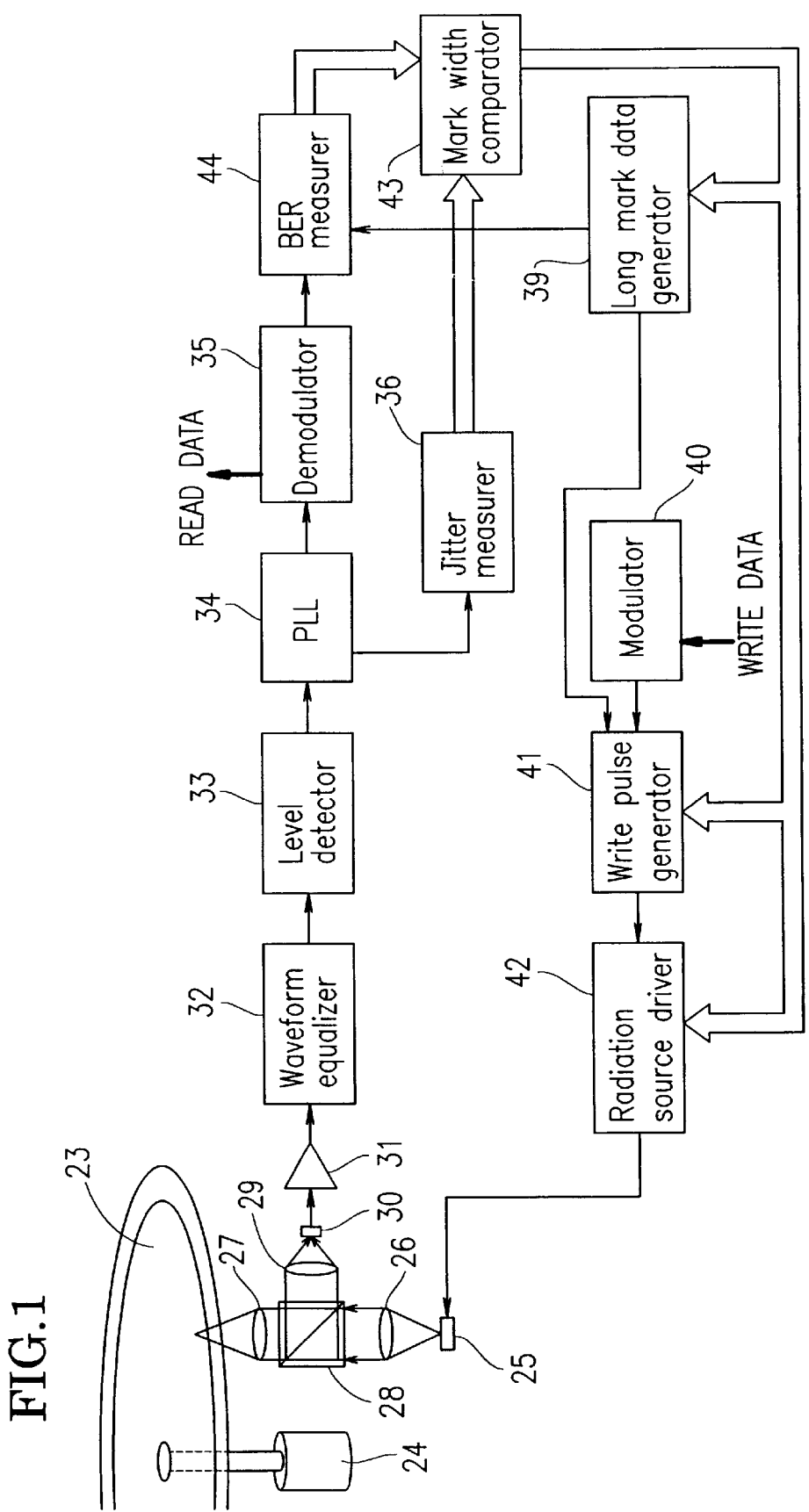
FIG. 1 is a block diagram illustrating an exemplary configuration for an inventive optical recording/reproducing apparatus.
Figure 2:
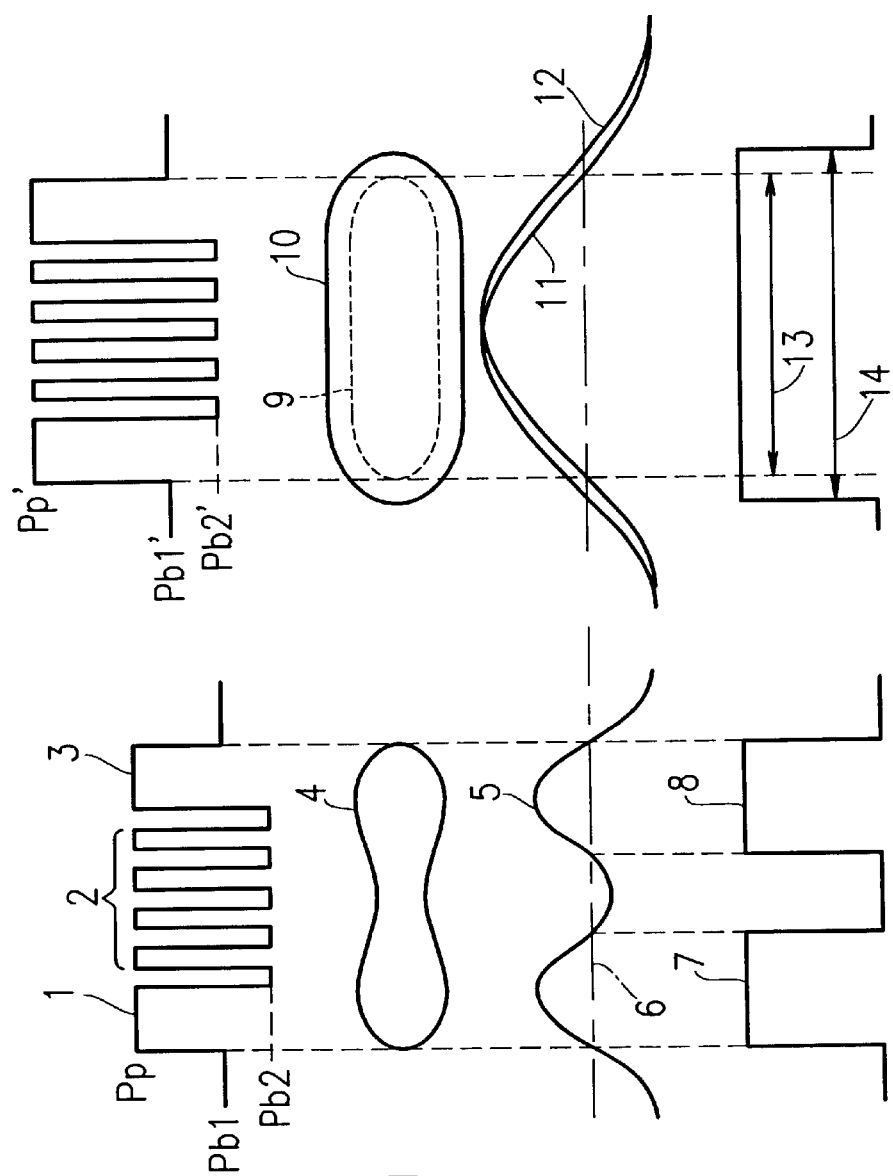
FIGS. 2(a)–(d) illustrate prior art relations between shapes of marks and signal waveforms observed in a conventional optical recording/reproducing apparatus.

Next, an embodiment of the optical recording/ reproducing apparatus according to the present invention will be described with reference to FIG. 1. As shown in FIG. 1, the apparatus includes spindle motor 24, semiconductor laser diode 25, condenser lens 26, objective lens 27, beam splitter 28, analyzer lens 29 and photodetector 30. A radiation beam, which has been emitted from the laser diode 25, is condensed by the condenser lens 26 and then focused by the objective lens 27 to form a beam spot on a rotating optical disk 23, which is driven by the spindle motor 23. The incident beam, which is reflected from the optical disk 23, is further reflected by the beam splitter 28 toward the photodetector 30 and then condensed by the analyzer lens 29 onto the photodetector 30. And the photodetector 30 photoelectrically converts the incident beam (i.e., readout radiation beam) into an electrical signal.

The read signal is output from the photodetector 30, amplified by a read signal amplifier 31 and is then input to a waveform equalizer 32 for correcting the radio frequency characteristics thereof. A read signal with a waveform such as that shown on the right-hand side of FIG. 3(c) is output from the waveform equalizer 32.

The output of the waveform equalizer 32 is provided to a level detector 33, which digitizes the read signal with respect to the threshold value 6. When the read signal 19 shown on the right-hand side of FIG. 3(c) is provided to the level detector 33, the two discrete digital pulses 21 and 22 are output from the level detector 33 as shown on the right-hand side of FIG. 3(d).

The digital pulses output from the level detector 33 are input to a Phase Locked Loop (PLL) 34 to extract data clock pulses therefrom. Then, the pulses from the PLL 34 are converted into binary data by a demodulator 35. During a normal readout operation, the binary data is output from the demodulator 35 as READ DATA.

A bit error rate (BER) measurer 44 receives the binary data output from the demodulator 35 to measure the bit error rate, i.e., the number of error bits contained in the binary data.

A jitter measurer 36 compares the leading and trailing edges of each digital pulse to the counterparts of a clock pulse that has been extracted by the PLL 34, thereby integrating phase shifts therebetween. In this manner, the jitter measurer 36 measures the variations in phase of the front and rear edges of a recorded mark, i.e., phase jitter in the marking or spacing period.

If the read signal 6 or 17 shown in FIG. 3(c) is input to the level detector 33, then the jitter measures relatively low. In contrast, if the read signal 19 with sharply rising twin peaks shown on the right-hand side of FIG. 3(c) is input to the level detector 33, then the jitter measured increases steeply. This is because the locations of the edges 37 and 38 shown on the right-hand side of FIG. 3(d) are indefinite and the phase shifts thereof with respect to the clock pulses extracted by the PLL 34 are also inconstant, thus greatly increasing the jitter. For further details about the jitter measurer 36, see U.S. Pat. No. 5,663,942, for example, which is hereby incorporated by reference.

The inventive optical recording/reproducing apparatus further includes modulator 40, write pulse generator 41 and radiation source driver 42. The modulator 40 receives and modulates input data WRITE DATA. In response to the output of the modulator 40, the write pulse generator 41 generates the write pulses. The radiation source driver 42 receives the output of the write pulse generator 41 and modulates the radiation beam emitted from the semiconductor laser diode 25.

During a normal data recording operation, the write pulse generator 41 generates various write pulses in accordance with the information (i.e., a table) stored on a nonvolatile memory (not shown) and in response to the output of the modulator 40. Specifically, basic numerical data items defining the waveform of each set of write pulses, e.g., number of pulses included in a multi-pulse train and widths of first and second pulses, are selected from the table depending on the length of an associated mark to be formed. Some of these numerical data items of a mark may be changed according to the lengths of spaces preceding and succeeding the mark in question.

The inventive optical recording/reproducing apparatus further includes a long mark data generator 39 for generating data needed in writing a test mark with a length equal to or greater than a preselected length on the information layer. In response to a data generation start signal output from a CPU in a system controller (not shown), the long mark data generator 39 is activated to generate the data needed in forming a mark with a predetermined length. The long mark data generator 39 may generate not just the data needed in forming a test mark with a fixed length, but also multiple sets of data items associated with test marks of various lengths.

The inventive optical recording/reproducing apparatus can form marks of varied lengths in the information layer of the optical disk in accordance with the data to be written WRITE DATA. That is to say, the long mark data generator 39 generates data needed for forming a test mark, which is long enough to have its middle portion narrowed, among the test marks of various lengths. The length of the test mark may be either fixed during the fabrication process of the apparatus or selected from multiple values.

The data output from the long mark data generator 39 is input to the write pulse generator 41, which generates the write pulses needed to form a mark with the length specified by the input data. In forming the test mark for the first time, the information defining the waveform of the write pulses is initialized based on the data stored in the nonvolatile memory. The initial values of the information defining the write pulses are preferably pre-stored in the nonvolatile memory of the optical recording/reproducing aparatus before the apparatus is shipped. Optionally, the initial values may be selected in accordance with the information stored in a special-purpose area of the optical disk (i.e., control data).

If the write pulses used for recording a short mark appropriately is compensated for by a conventional technique, the information defining the waveform of the compensated write pulses is stored on either the nonvolatile memory of the optical recording/reproducing apparatus or on the optical disk 23. In a situation where the write pulses are compensated for by the conventional technique and then corrected by the inventive technique, the write pulses that have been compensated for by the conventional technique are preferably used in forming the test mark for the first time.

After the write pulses have been corrected by the inventive technique, the information needed to define the corrected write pulses (i.e., correction information) is preferably stored on the nonvolatile memory within the apparatus or on the optical disk 23. This is because in a situation where the optical disk 23 is loaded into the apparatus after having been unloaded therefrom, the waveform of write pulses needed in forming a long mark can be defined by using the previous correction information as the initial values. That is to say, if that previously fixed correction information is applicable to the initialization required for a current correction process, then the current correction process can be performed in a shorter time.

The inventive optical recording/reproducing apparatus further includes a mark width comparator 43, which is implementable as a programmable data processor including CPU and memory in the system controller. The mark width comparator 43 receives the output(s) of the jitter measurer 36 and/or the BER measurer 44, thereby determining whether or not a test mark has an excessively narrowed middle portion. Optionally, the programmable data processor may selectively change the mode of operation from READ into WRITE, or vice versa, with its timing controlled in accordance with a pre-stored program, not just the decision concerning the narrowed middle portion of a long mark.

Hereinafter, it will be described how the inventive optical recording/reproducing apparatus records a test mark on the optical disk 23 and checks the shape of the test mark written.

First, when the optical disk 23 is loaded into this apparatus, known write power compensation is started to regulate the write power such that a short mark can be written appropriately. As a result, the peak power Pp, bias power 1 Pb1 and bias power 2 Pb2 of the write pulses are defined. After this compensation operation is finished, the long mark data generator 39 is activated responsive to the data generation start signal from the system controller and the write pulse generator 41 generates the write pulses to form a test mark. The write pulses generated are input to the radiation source driver 42, which drives the semiconductor laser diode 25 such that the write power is modulated among the three levels of the peak power Pp, bias power 1 Pb1 and bias power 2 Pb2. The optical disk 23 is irradiated with the write radiation that has been emitted from the semiconductor laser diode 25. As a result, a test mark is recorded in the information layer of the disk 23.

Next, a signal associated with the test mark recorded on the optical disk 23 is read out. During this readout operation, the jitter of the read signal is measured by the jitter measurer 36. The numerical data representing the jitter measured is transferred to the mark width comparator 43. In response, the mark width comparator 43 compares the numerical data representing the transferred, measured jitter to a pre-stored reference jitter. Specifically, if the jitter measured is greater than the reference jitter, then the mark width comparator 43 determines that the test mark recorded has a narrowed middle portion. In other words, the existence of an area where the optical characteristics have not changed sufficiently for reading out the test mark correctly (i.e., the read-error-inducing portion) in the test mark is confirmed.

Alternatively, the decision concerning the shape of the test mark recorded may also be performed by getting the BER of the demodulated binary data, which has been output from the demodulator 35, measured by the BER measurer 44.

Hereinafter, it will be exemplified how to sense the narrowed middle portion of a test mark based on the BER measured. The demodulator 35 cannot demodulate the digital pulses 21 and 22 shown on the right-hand side of FIG. 3(d) correctly and therefore outputs erroneous binary data. Then, the BER measurer 44 compares the erroneous binary data to the original data generated by the long mark data generator 39, thereby outputting a BER representing the number of erroneous bits contained.

This BER is transferred to the mark width comparator 43, which compares the BER to a pre-stored reference BER. If the given BER is higher than the reference BER, then the mark width comparator 43 determines that the test mark recorded has a narrowed middle portion.

Figure 9:
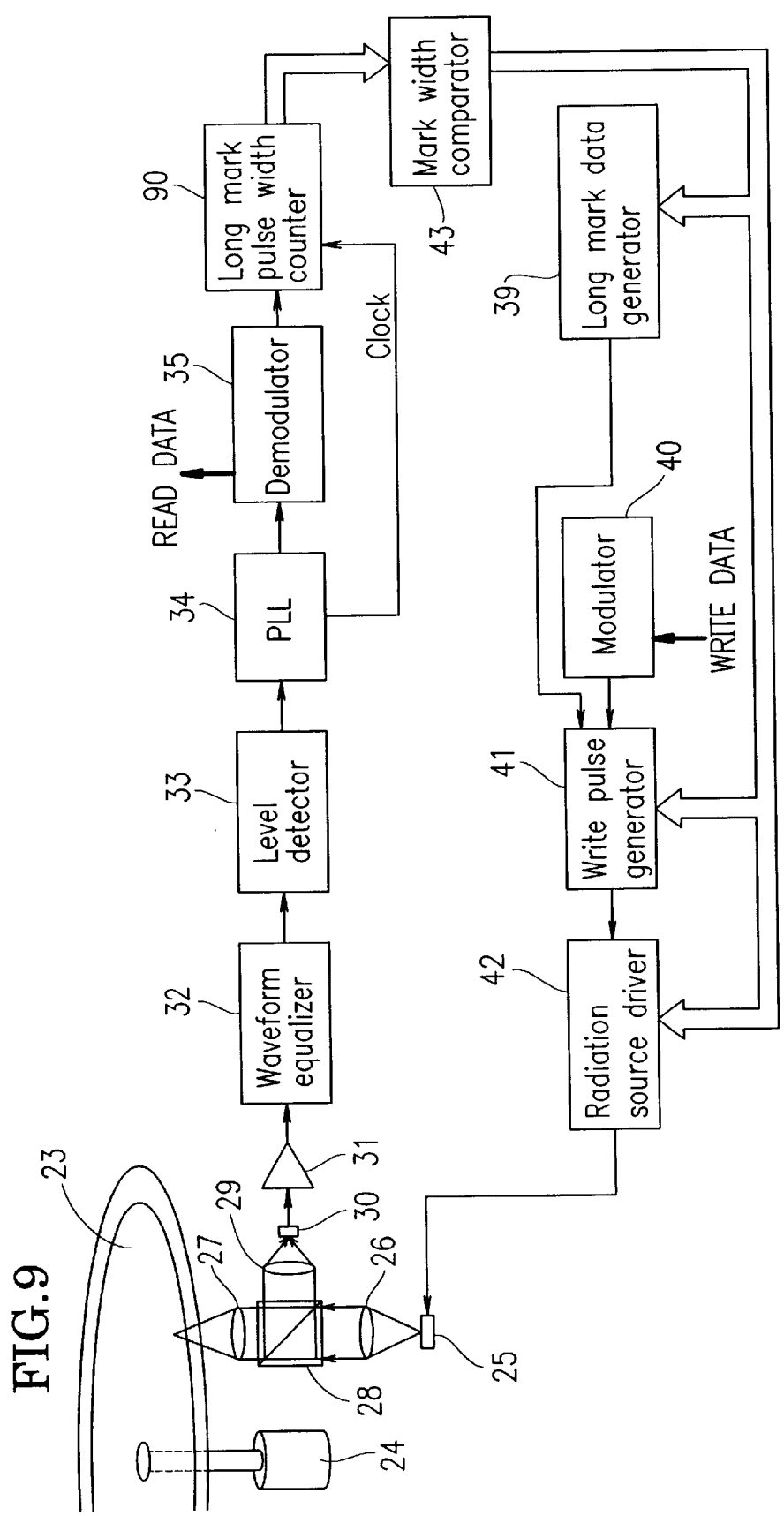
FIG. 9 is a block diagram illustrating another exemplary configuration for the inventive optical recording/reproducing apparatus.

In this example, the shape determination of the test mark is carried out using the jitter or BER. Alternatively, the test mark may be checked based on the estimated length thereof. FIG. 9 illustrates an alternative embodiment of the inventive optical recording/reproducing apparatus including a long mark pulse width counter 90 connected to the outputs of the demodulator 35 and PLL 34. The long mark pulse width counter 90 receives the binary data output from the demodulator 35 and the clock pulses supplied from the PLL 34, thereby counting the number of clock pulses corresponding to the length of the test mark. Specifically, if a test mark with an original length L corresponding to the number m of clock pulses has the width of its middle portion reduced too much, then the number of clock pulses representing the length of the binary data associated with the test mark is different from the original number m. The narrowed middle portion of the test mark may also be found in this manner.

II. Write Power Correction

Once the existence of an excessively narrowed middle portion has been recognized in a long test mark in this manner, the write power should be corrected. As already described with reference to FIGS. 2(a)–(d), if the write power is corrected by the conventional technique, then the width and length of a mark both increase more than normal, thus possibly causing some unintentional error.

Hereinafter, a novel write power correction method according to the present invention will be described with reference to FIGS. 4(a)–(d).

Figure 4:
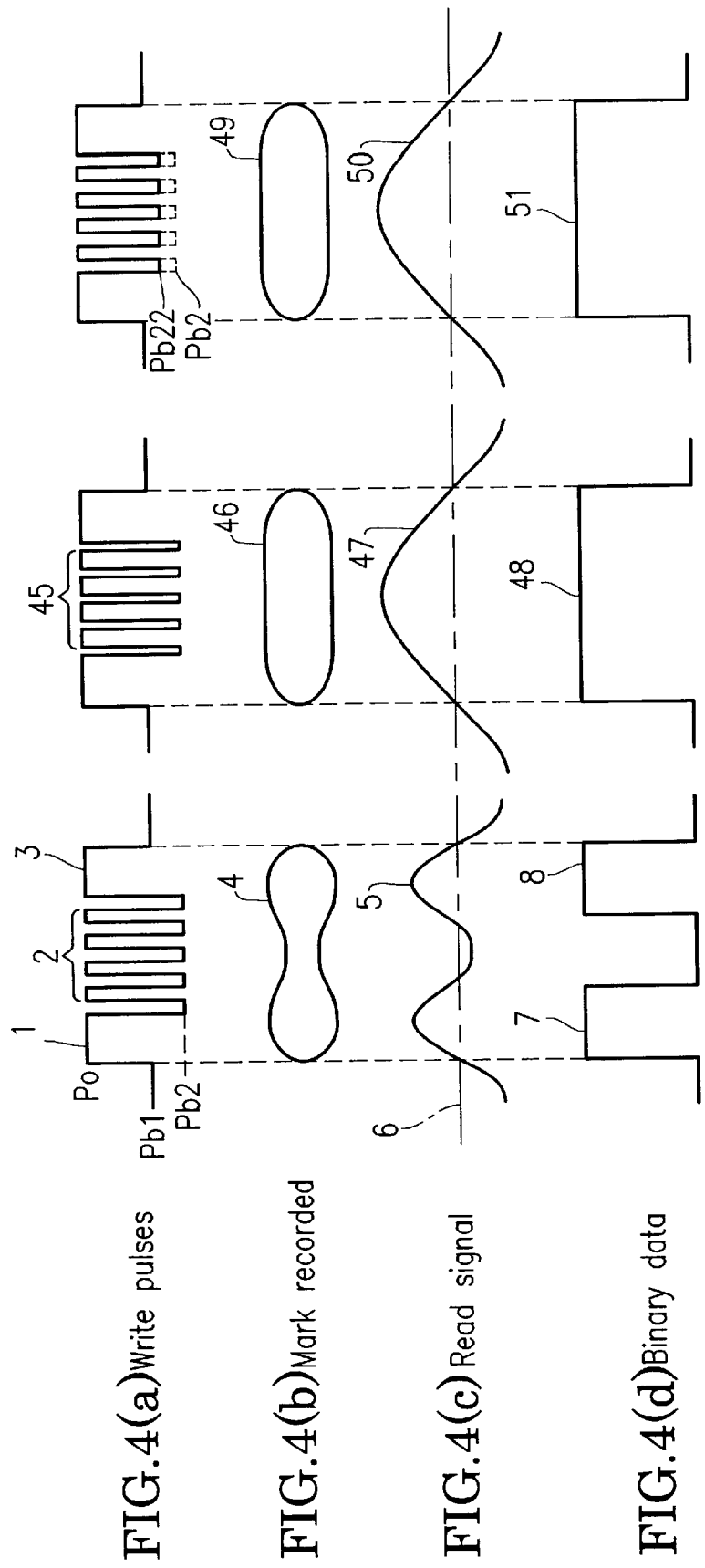
FIGS. 4(a)–(d) illustrate relations between shapes of marks and signal waveforms observed in an inventive optical recording/reproducing apparatus.

Suppose a test mark 4 with an excessively narrowed middle portion has been formed using the write pulses as shown on the left-hand side of FIGS. 4(a) and (b). A read signal 5 associated with such a test mark 4 has twin peaks as shown on the left-hand side of FIG. 4(c). And when the read signal 5 is digitized with respect to the threshold value 6, the resultant binary data has two discrete digital pulses 7 and 8 as shown on the left-hand side of FIG. 4(d).

According to a first exemplary correction technique of the present invention, the duty cycle of the multi-pulse train 45 is set higher as shown at the center of FIG. 4(a). The mark 4 has narrowed its middle portion due to the shortage of thermal energy in the multi-pulse train 2. Thus, if the average thermal energy applied is raised by broadening the width of each pulse included in the multi-pulse train 2, i.e., by increasing the duty cycle thereof, then the shortage of thermal energy can be eliminated.

When the multi-pulse train 45 with the increased pulse width, or duty cycle, is adopted, a mark 46 with a uniform width can be formed as shown at the center of FIG. 4(b). A read signal 47 such as that shown at the center of FIG. 4(c) is derived from such a mark 46. As a result, desired binary data 48 is obtained from the read signal 47 as shown at the center of FIG. 4(d).

According to a second exemplary correction technique of the present invention, the level of the bias power 2 Pb2 is raised to the level of a bias power 22 Pb22 as shown on the right-hand side of FIG. 4(a). By increasing the lower bias power level for the pulse-to-pulse interval of the multi-pulse train, the shortage of thermal energy can also be eliminated.

When the write pulses with an increased bias power 22 Pb22 are adopted, a mark 49 with a uniform width can be formed as shown on the right-hand side of FIG. 4(b). A read signal 50 such as that shown on the right-hand side of FIG. 4(c) is derived from such a mark 49. As a result, desired binary data 51 is obtained from the read signal 50 as shown on the right-hand side of FIG. 4(d).

By changing either the width of the pulses included in the multi-pulse train 2 (i.e., the duty cycle thereof) or changing the lower bias power level for the pulse-to-pulse interval of the multi-pulse train from its initial value, the width of a mark to be recorded can be uniformized.

As can be understood, radiation energy applied to an intermediate area between the front and rear edges of a mark is partially increased according to the present invention substantially without increasing the radiation energy applied to the front and rear edges of the mark. As a result, the causes of the middle-narrowing phenomenon of a mark (i.e., shortage of thermal energy) can be eliminated and the width of the mark can be uniformized effectively. It should be noted, however, that the method for correcting the write power is not limited to the exemplified ones. For example, a long mark may be recorded using write pulses in which the maximum power level of the multi-pulse train 2 is set higher than that of the first or second pulse 1 or 3.

III. Correction Process 1

Figure 5:
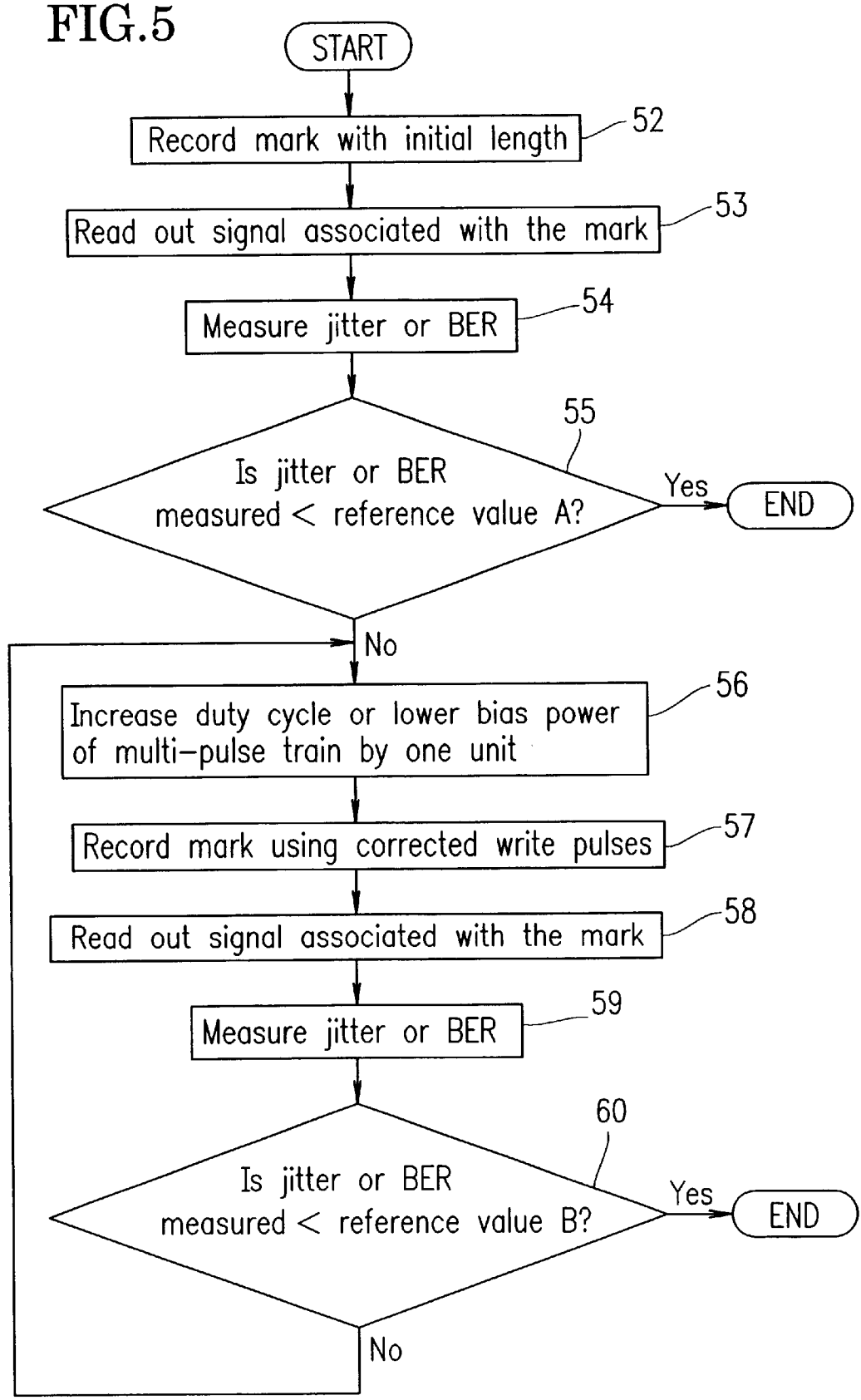
FIG. 5 is a flowchart illustrating a write power correction operation performed by the inventive optical recording/reproducing apparatus.

Next, it will be described in further detail with reference to FIG. 5 how to correct the energy of the write radiation with the pulse width, or the duty cycle, of the multi-pulse train 2 changed.

The inventive correction process is preferably performed every time an optical disk is loaded into the optical recording/reproducing apparatus. However, the known write power compensation should be performed after the optical disk has been loaded into the apparatus and before the inventive correction is carried out.

In performing the known write power compensation, a relatively short mark is written as a test mark in the information layer, α signal associated with the mark is read out and then the write power is compensated for to reduce the read errors. First, the entire write power is increased by the factor of a as shown on the right-hand side of FIG. 2(a). After the amplitude of the write power has been determined this way, the widths of the first and second pulses are optimized. When this write power compensation is carried out, the initial test mark is written in the information layer using the write pulses that have been defined by the write pulse generator 41 in accordance with the initializing data. As the initializing data, parameter data, which is stored in advance on the optical disk 23 or the memory of the optical recording/reproducing apparatus, may be used.

The known write power compensation is performed to record a relatively short mark appropriately, and then the inventive power correction is carried out to record a relatively long mark just as intended. Hereinafter, an exemplary inventive power correction process will be detailed.

First, in Step 52, a test mark with a length equal to or greater than a preselected length is recorded on the optical disk 23. The test mark is preferably recorded in a test area provided in the inner or outer radius zone of the optical disk 23. Next, in Step 53, a signal associated with the test mark is read out. Then, in Step 54, a jitter or BER is measured. Subsequently, in Step 55, it is determined whether or not the jitter or BER measured is smaller than its reference value A. If the answer is YES, the correction process ends, because there is no need to correct the write power.

On the other hand, if the jitter or BER measured is found to be equal to or greater than its reference value A, then the method proceeds to Step 56. In Step 56, the write power is corrected in the above-described manner. For instance, the duty cycle of the multi-pulse train 2 is increased by one unit, which is equivalent to broadening the width of each pulse included in the multi-pulse train 2 by one nanosecond, for example. Alternatively, the lower bias power 2 Pb2 for the pulse-to-pulse interval of the multi-pulse train 2 may be raised by one unit, which is equivalent to increasing the bias power level 2 Pb2 by 1 mW.

Thereafter, in Step 57, the test mark is recorded using the write radiation with the corrected waveform. Next, in Step 58, a signal associated with the recorded test mark is read out. Then, in Step 59, the jitter or BER involved with the test mark is measured. In Step 60, it is determined whether or not the jitter or BER measured is smaller than its reference jitter B. If the answer is YES, the correction process ends.

The reference jitter B used in Step 60 is preferably set equal to or lower than the reference jitter A for Step 55. This is because the correction process will be finished in a shorter time if the jitter is lower than the reference jitter A when the same optical disk is subjected to this correction process again. The same statement is also applicable to the BER. That is to say, the reference BER B used in Step 60 is preferably set equal to or lower than the reference BER A for Step 55.

If the jitter or BER measured is found to be equal to or greater than its reference value B in Step 60, then the method returns to Step 56. In such a case, the duty cycle or the lower bias power 2 Pb2 of the multi-pulse train 2 is increased by one more unit. As can be seen, the correction process illustrated in FIG. 5 has a loop in which the jitter or BER is measured every time the write power is corrected.

Figure 6:
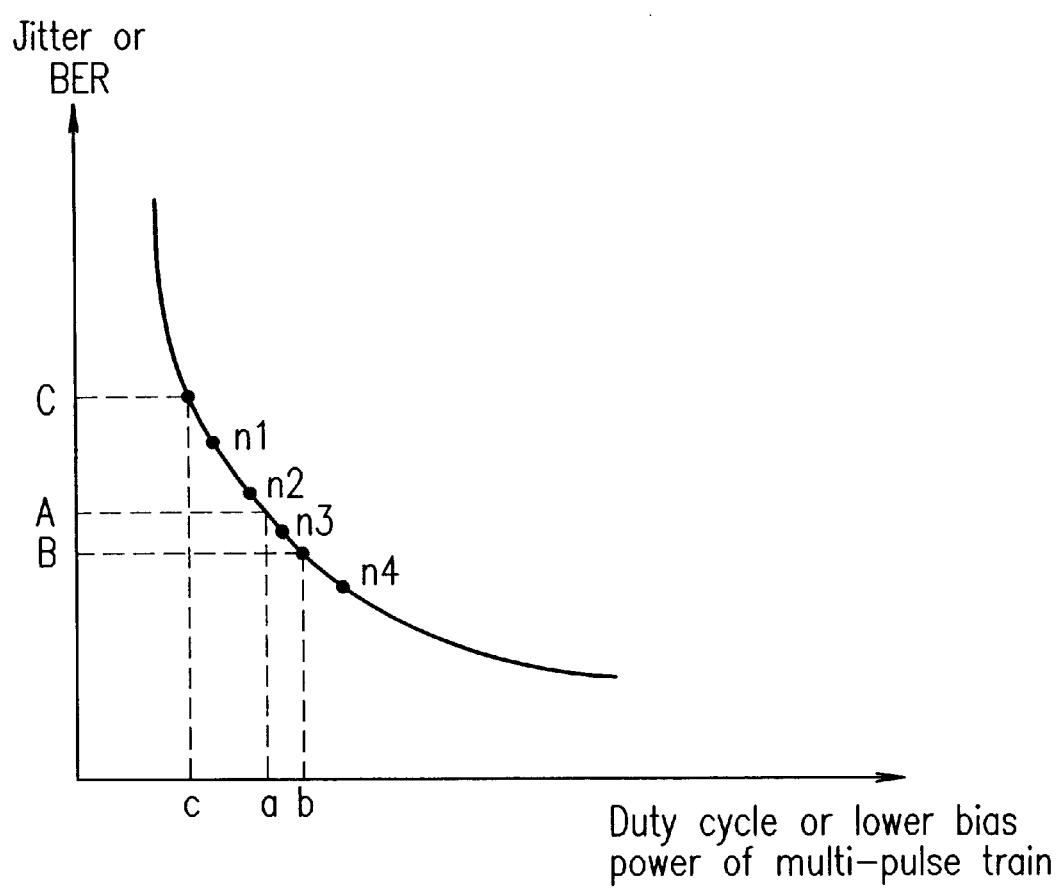
FIG. 6 is a graph schematically illustrating a variation in characteristics of read data during the correction operation shown in FIG. 5.

Next, the relation between the jitter or BER and the duty cycle or lower bias power of the multi-pulse train will be described with reference to FIG. 6. In FIG. 6, the abscissa represents the duty cycle or the lower bias power of the multi-pulse train, while the ordinate represents the jitter or BER involved with a long mark that has been recorded under the condition defined by the abscissa.

In FIG. 6, point c represents the initial duty cycle or bias power of the multi-pulse train when the test mark is recorded for the first time. Point C associated with point c represents the initial jitter or BER at this time.

Since the jitter or BER at the ordinate point C is higher than its reference value A, the duty cycle or lower bias power of the multi-pulse train is increased to reduce the jitter or BER. Point n1 is associated with a duty cycle or lower bias power of the multi-pulse train that has been increased from its initial value by one unit. In such a state, the jitter or BER is still higher than its reference value B. Each of points n2, n3 and n4 is associated with a duty cycle or lower bias power of the multi-pulse train that has been increased from its previous value by one unit. Every time the duty cycle or lower bias power is corrected, the resultant jitter or BER is measured and compared to its reference B at each of the points. In the illustrated example, the correction process ends at the point n4, because the jitter or BER measured is found to be lower than its reference B for the first time at point n4.

IV. Correction Process 2

Hereinafter, another exemplary process of correcting the energy of write radiation will be described with reference to FIG. 7.

First, in Step 61, a test mark with a length equal to or greater than a preselected length is recorded in the test area of the optical disk 23. Next, in Step 62, a signal associated with the long test mark is read out. Then, in Step 63, a jitter or BER is measured. Subsequently, in Step 64, it is determined whether or not the jitter or BER measured is smaller than its reference value A. If the answer is YES, the correction process ends, because there is no need to correct the write power.

On the other hand, if the jitter or BER measured is found to be equal to or greater than its reference value A, then the method advances to Step 65. In Step 65, the write power is corrected in the above-described manner. For instance, the duty cycle of the multi-pulse train 2 is increased by one unit. Alternatively, the lower bias power 2 Pb2 for the pulse-to-pulse interval of the multi-pulse train 2 may be increased by one unit.

Thereafter, the long test mark is recorded in Step 66 using the corrected write pulses and then the number of times the mark has been recorded using the corrected write pulses is counted in Step 67. Steps 65 and 66 are repeatedly performed until the number of times counted in Step 67 reaches N, which is a positive integer equal to or greater than 2 and represents the number of different types of conditions for the write radiation. Alternatively, the test mark may be written on the number N of recording tracks using write radiation beams corrected in mutually different manners. If the write power is corrected by increasing the duty cycle of the multi-pulse train 2 by one unit every time, then N may be selected so as to make the duty cycle of the multi-pulse train smaller than 100%. On the other hand, if the write power is corrected by increasing the lower bias power level 2 Pb2 of the multi-pulse train 2 by one unit every time, then N may be selected so as to make the lower bias power level of the multi-pulse train smaller than the peak power level may be within a range from 5 to 10, for example.

When the count reaches N in Step 67, the method proceeds to Step 68, in which respective signals associated with the N types of long marks recorded in Steps 65, 66 and 67 are read out one after another.

Then, in Step 69, the jitter or BER involved with each of these marks is measured. In Step 70, it is determined whether or not the jitter or BER measured is smaller than its reference jitter B. If the answer is YES, the width of the mark can be regarded as having been uniformized as a result of the correction and therefore the correction process ends.

The reference jitter B used in Step 70 is preferably set equal to or smaller than the reference jitter A for Step 64. This is because the correction process will be finished in a shorter time if the jitter is lower than the reference jitter A when the same optical disk is subjected to this correction process again. The same statement is also applicable to the BER. That is to say, the reference BER B used in Step 70 is preferably set equal to or lower than the reference BER A for Step 64.

If the jitter or BER measured is found to be equal to or greater than its reference value B in Step 70, then the method returns to Step 68. In such a case, a signal associated with the next mark, which has been recorded on the next track with the duty cycle or lower bias power 2 Pb2 of the multi-pulse train 2 increased by one unit, is read out. And Steps 68, 69 and 70 are repeatedly performed until the jitter or BER measured is found lower than its reference value B.

Figure 7:
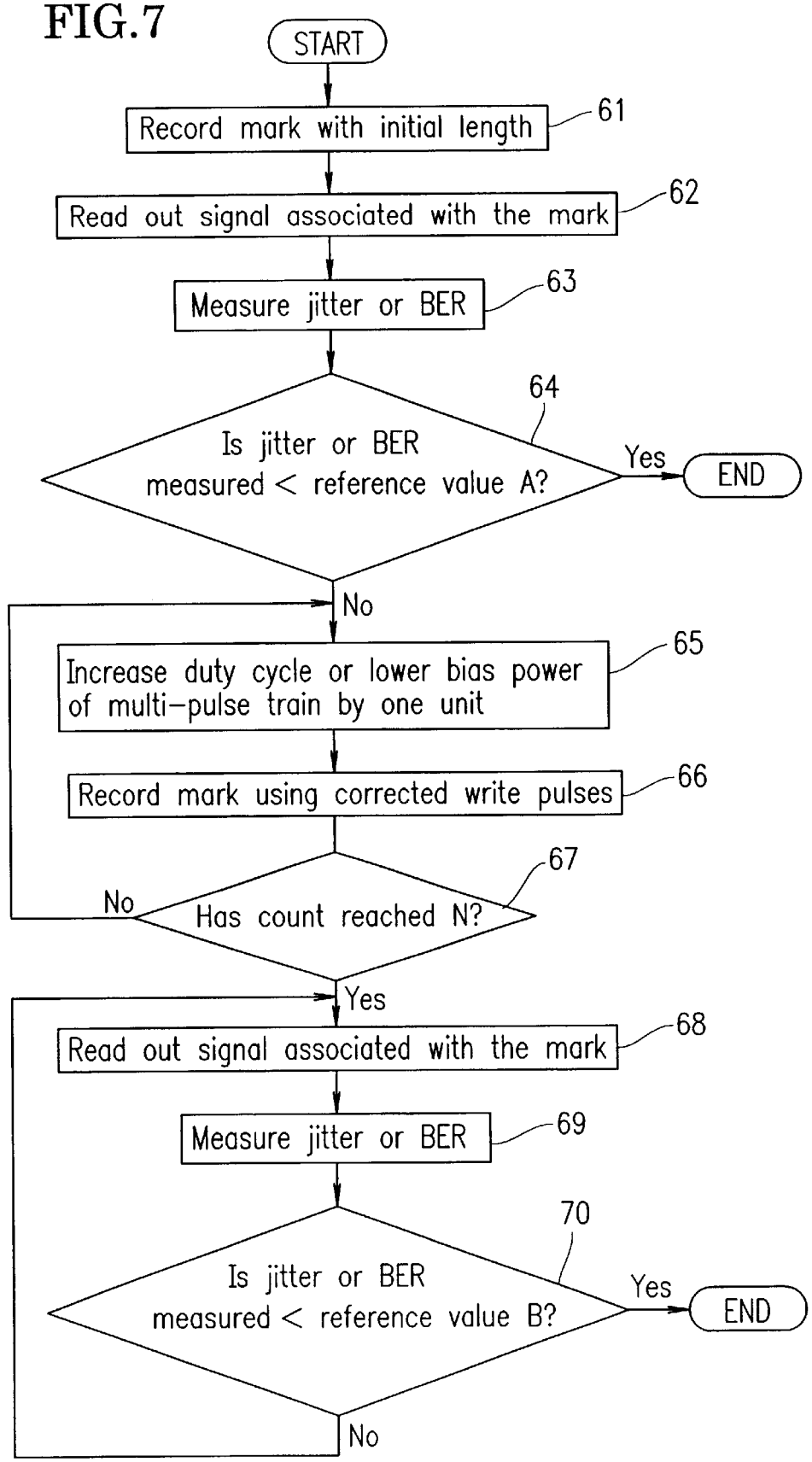
FIG. 7 is a flowchart illustrating another write power correction operation performed by the inventive optical recording/reproducing apparatus.

In this manner, according to the correction process illustrated in FIG. 7, the N types of test marks are recorded in advance in the test area under mutually different conditions, respective signals associated with these marks are read out one after another, and then the jitters or BER's are measured. These N types of test marks may be recorded on the same number of different tracks.

Figure 8:
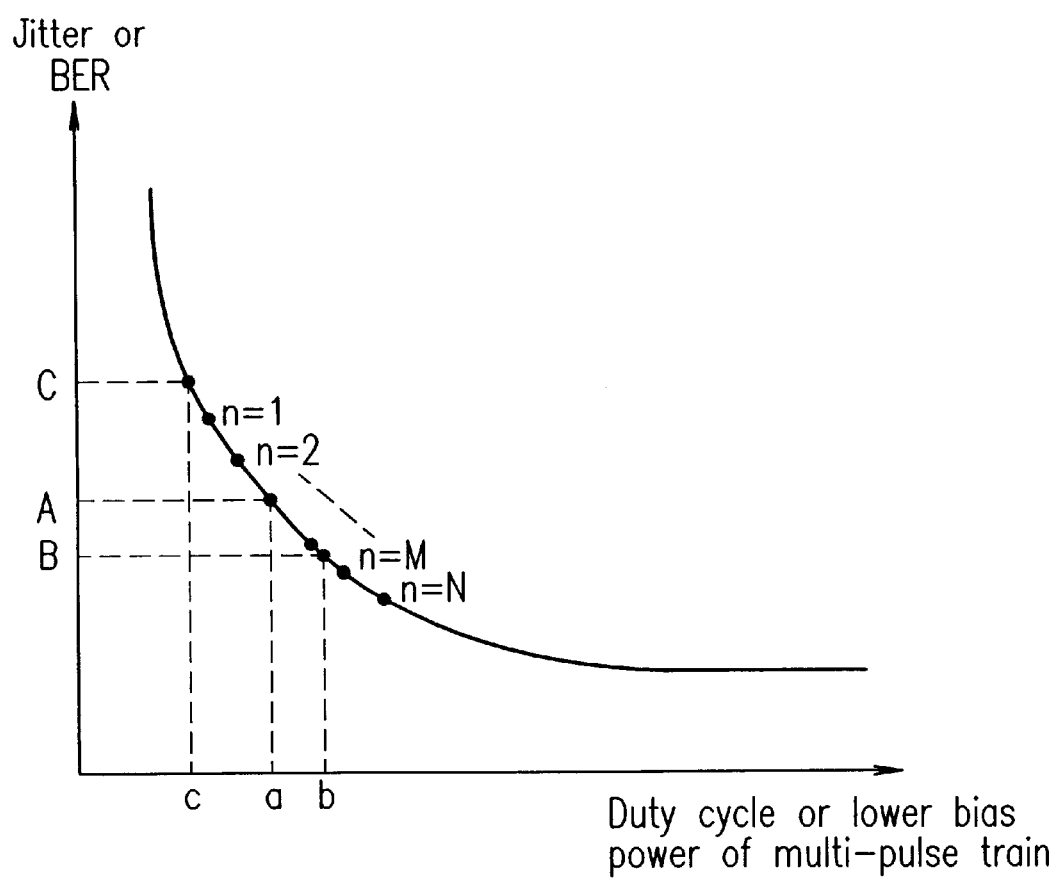
FIG. 8 is a graph schematically illustrating a variation in characteristics of read data during the correction operation shown in FIG. 7.

Next, the relation between the jitter or BER and the duty cycle or lower bias power of the multi-pulse train will be described with reference to FIG. 8. In FIG. 8, the abscissa represents the duty cycle or lower bias power of the multi-pulse train, while the ordinate represents the jitter or BER involved with a long mark that has been recorded under the condition defined by the abscissa.

In FIG. 8, point c represents the initial duty cycle or lower bias power of the multi-pulse train when the long test mark is recorded under the initial condition. Point C associated with the point c represents the initial jitter or BER at this time.

Since the jitter or BER at point C is higher than its reference value A, the duty cycle or lower bias power of the multi-pulse train is increased to reduce the jitter or BER. In the example illustrated in FIG. 8, the N types of test marks are recorded under mutually different conditions with the duty cycle or lower bias power of the multi-pulse train increased one by one, i.e., where n=1 to N. If the conditions for recording the test marks are changed every track, then the N types of recording conditions correspond to the N tracks, respectively.

Next, signals are read out successively (i.e., starting with a track where n=1) from respective tracks on which the marks have been recorded under mutually different conditions and resultant jitters or BER's are measured. In the example illustrated in FIG. 8, the jitter or BER measured at a point where n=M is found to be lower than its reference value B for the first time. Accordingly, the write power may be corrected under the recording conditions corresponding to this point.

As described above, according to the present invention, if a test mark with a narrowed middle portion is found, the width of the mark can be uniformized by performing the process steps of correcting the width of each pulse or the lower bias power of the multi-pulse train 2.

V. DVD-RAM

The inventive optical recording/reproducing apparatus is suitably applicable to writing or reading information onto/from an optical disk complying with a digital versatile disc random access memory (DVD-RAM) format.

In accordance with the DVD-RAM format, an eight-to-sixteen modulation coding is adopted and marks are recorded to have nine different lengths associated with nine types of non-return to zero inverted (NRZI) signals with lengths of 3T, 4T, . . . , 11T, respectively. T is a period of a channel clock signal and corresponds to the length of a signal of one bit. Thus, this period is called a "channel-bit period". In this case, the maximum length of multiple marks associated with the information to be recorded is represented as "11T", while the minimum length thereof as "3T". When a mark is written on an information layer using laser radiation with its power compensated for by the conventional write power compensation technique, almost no middle narrowing is observed for marks with lengths corresponding to 6T or less. Thus, the lengths of test marks preferably correspond to 7T or more. Since a mark with a length represented as 11T is most likely to have the width in the middle portion reduced, the length of the test mark should preferably be 11T.

However, even if a write power is corrected by forming an 11T mark as a test mark, the results of the correction do not have to be applied to all the marks with respective lengths represented as 3T, 4T, . . . , 11T. For example, the write power may be corrected only when marks with lengths equal to or greater than 7T, i.e., 7T, 8T, 9T, 10T and 11T, are formed. In such a case, the correction may be performed for all of these 7T to 11T marks using the same coefficient. Alternatively, the correction coefficient may be changed depending on the length of a mark to be formed. For example, the correction may be carried out with the duty cycle of the multi-pulse train 2 set to 51% for the 7T to 9T marks and 53% for the 10T and 11T marks.

Figure 10:
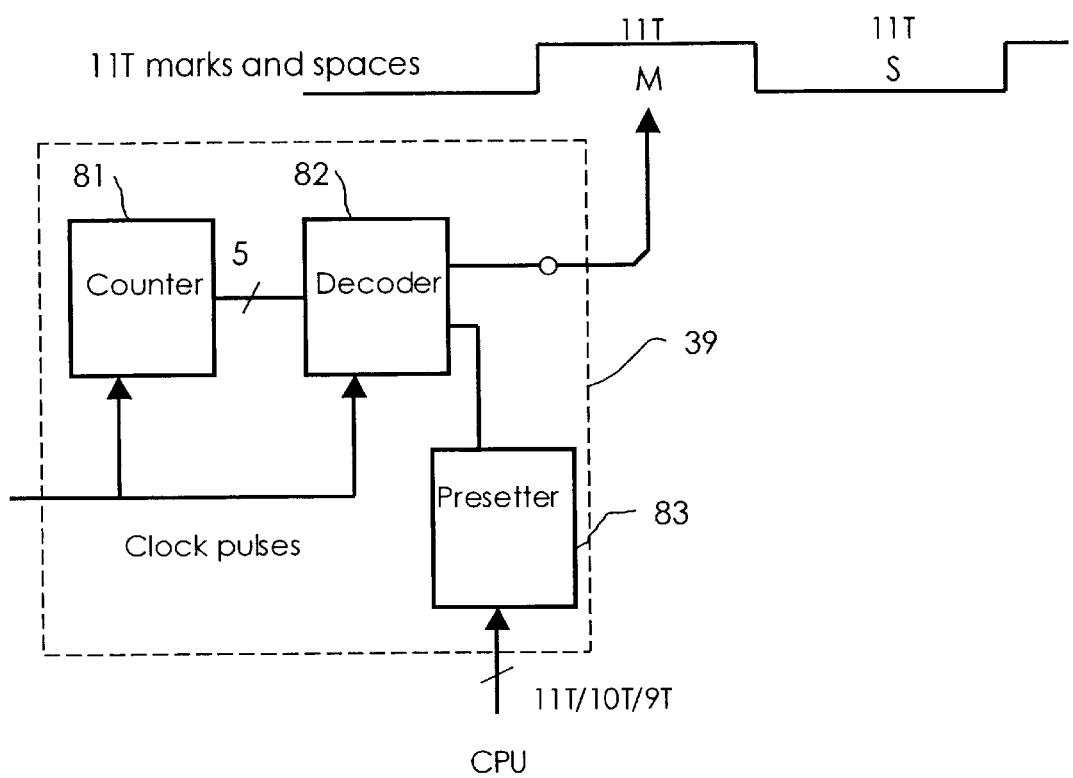
FIG. 10 is a block diagram illustrating an exemplary configuration for the long mark data generator shown in FIG. 1 or 9.

When the eight-to-sixteen modulation coding technique is adopted, the long mark data generator 39 shown in FIG. 1 may have a configuration such as that illustrated in FIG. 10. As shown in FIG. 10, the long mark data generator 39 includes counter 81, decoder 82 and presetter 83. The counter 81 counts the number of input clock pulses and provides the count represented as a five-bit signal, for example, to the decoder 82. The presetter 83 is connected to the decoder 82. In accordance with instructions issued from a CPU, the presetter 83 produces count data corresponding to the lengths represented as 9T, 10T and 11T, respectively, and transfers the data to the decoder 82. In response, the decoder 82 compares the count data supplied from the presetter 83 to the count supplied from the counter 81 and outputs a pulse associated with one of the counts that matches the count data supplied. As a result, data corresponding to a mark or space with a length of 11T, for example, is output from the decoder 82.

Figure 11:
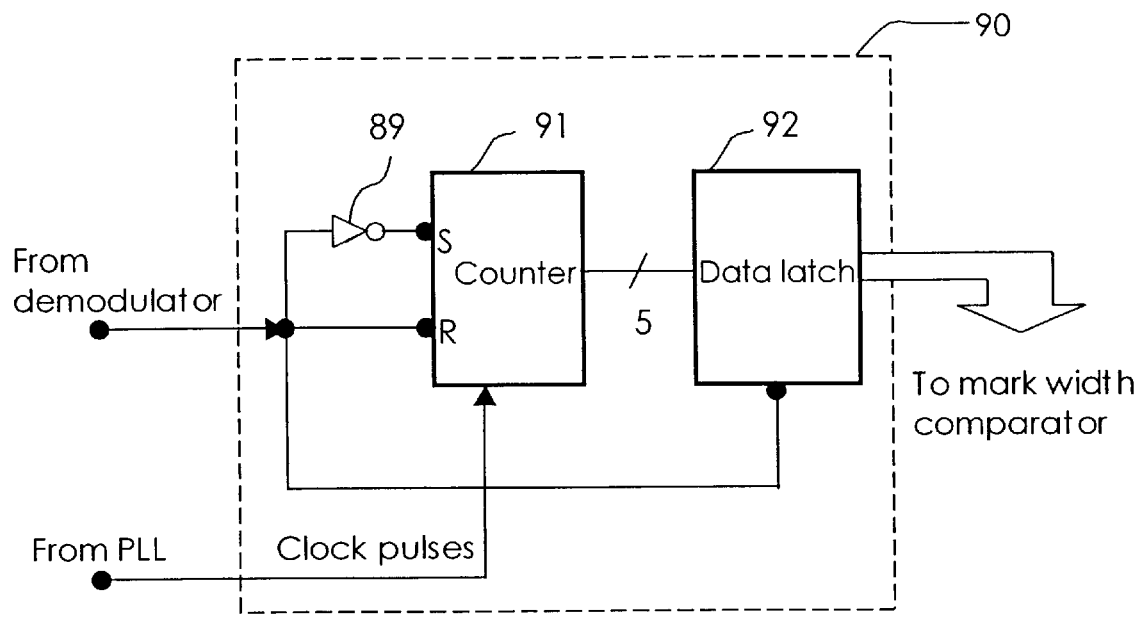
FIG. 11 is a block diagram illustrating an exemplary configuration for the long mark pulse width counter shown in FIG. 9.

The long mark pulse width counter 90 shown in FIG. 9 may have a configuration 15 such as that illustrated in FIG. 11. As shown in FIG. 11, the long mark pulse width counter 90 includes a counter 91 and a data latch 92. The binary data, which has been output from the demodulator 35, is input to the SET terminal S of the counter 91 by way of an inverter 89. The binary data output from the demodulator 35 is also input to the RESET terminal R of the counter 91. A clock signal is input from the PLL 34 to the clock terminal of the counter 91. The counter 91 counts the number of clock pulses supplied between the leading and trailing edges of the binary data received from the demodulator 35, and provides the count to the data latch 92. Synchronously with respect to the trailing edge of the binary data output from the demodulator 35, the data latch 92 latches the count of the counter 91, and then outputs the count to the mark width comparator 43.

Figure 12:
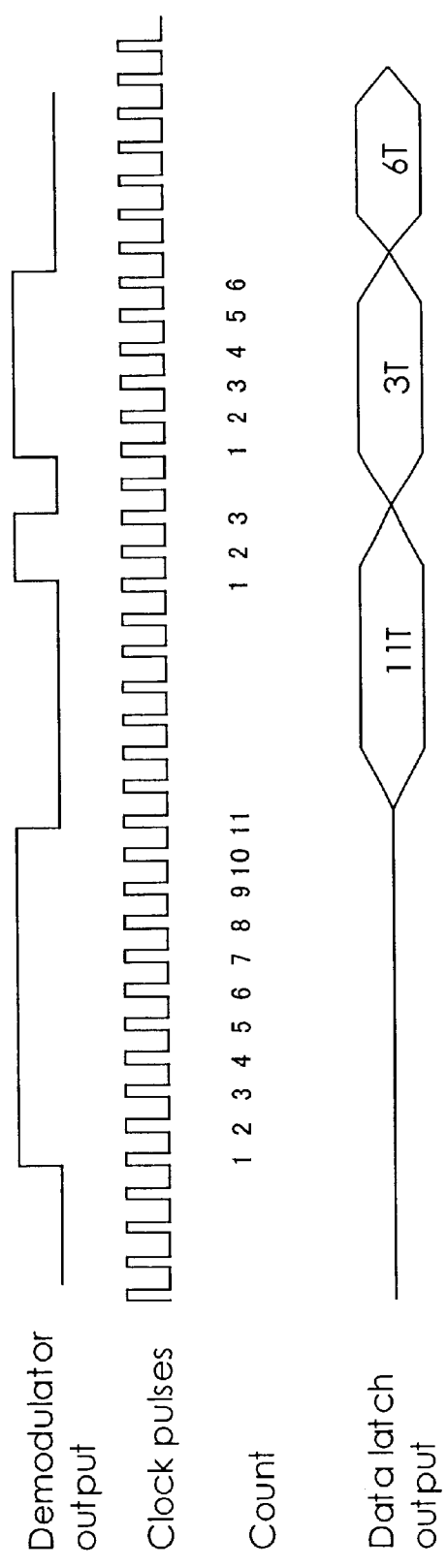
FIG. 12 is a timing diagram illustrating how the long mark pulse width counter operates.

FIG. 12 is a timing diagram illustrating output of the demodulator 35, clock pulses, counts and output of the data latch 92. In this case, the mark width comparator 43 is so constructed as to determine, by reference to the output of the data latch 92, whether or not the data read out from the test mark has a desired length.

In the foregoing embodiment, the eight-to-sixteen modulation coding technique is utilized. However, those skilled in the art will recognize that the effects of the present invention are attainable by any other modulation coding techniques.

Although an embodiment of the present invention has been described as being applied to an apparatus for writing or reading information onto/from a phase-change storage medium, the present invention is not limited to such a specific embodiment. For example, the present invention is applicable to an apparatus for recording or reproducing information onto/from a magneto-optic recording medium. In such an alternative embodiment, at least part of the information layer of the recording medium is made of a magnetic material and the optical characteristics (e.g., angle of Kerr rotation) of the information layer change due to both a magnetic field applied and a radiation beam irradiated.

Also, it should be noted that the present invention is not limited by the waveform of the write radiation exemplified in the foregoing embodiment. For example, the amplitude of the multi-pulse train 2 may be different from that of the first and second pulses. As another alternative, part of the pulses included in the multi-pulse train 2 may have an amplitude or pulse width different from that of the other pulses in the train.

In the inventive optical recording/reproducing apparatus for forming multiple marks with mutually different lengths in an information layer of an information carrier, a relatively long test mark with a length equal to or greater than a preselected length is recorded and a signal associated with the mark is read out, thereby correcting the power of a radiation beam in such a manner as to uniformize the width of the long mark. Thus, according to the present invention, a middle-narrowing phenomenon, which is often observed in a long mark, can be suppressed just as intended and read errors can be reduced even when the sensitivity of the information carrier is low.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for forming multiple marks with nine mutually different lengths, which are represented as 3T through 11T according to an eight-to-sixteen modulation coding technique, in an information layer of a rewritable information carrier by irradiating the information layer with a pulsed radiation beam, wherein a test mark with a length equal to or greater than 7T is recorded in the information layer, a signal associated with the test mark is read out and then the average power applied to marks with various lengths equal to or greater than 7T is changed to uniformize the widths of the marks.

2. An apparatus for forming multiple marks, which are associated with information to be recorded, in an information layer of an information carrier by irradiating the information layer with a pulsed radiation beam such that optical characteristics of the information layer are locally changed, the apparatus comprising:

information write means for generating write pulses in forming each said mark and for modulating the radiation beam with the write pulses;

information readout means for sensing a variation in the optical characteristics of respective parts of the information layer where the marks have been formed;

a long mark data generator for getting at least one test mark written in the information layer by the information write means, the length of the test mark being equal to or greater than a preselected length; and a mark width comparator for determining whether or not the test mark includes a read-error-inducing portion in which the optical characteristics have not changed sufficiently for reading out a signal associated with the test mark correctly, wherein if there is the read-error-inducing portion in the test mark, an average power of the radiation beam is increased from an initialized level in forming a mark with a length at least equal to that of the test mark, thereby correcting the power in such a manner as to eliminate the read-error-inducing portion from the mark.

3. An apparatus according to claim 2, wherein the power is corrected by partially increasing the power of the radiation beam for a middle portion of the mark to be formed.

4. An apparatus according to claim 2, wherein the information write means generates at least two pulses, which include a first pulse and a second pulse that is spaced apart from the first pulse, as the write pulses in forming each said mark, and wherein the length of each said mark depends on the number of the pulses associated with the mark.

5. An apparatus according to claim 4, wherein the power is corrected by changing an amplitude of at least one pulse located between the first and second pulses.

6. An apparatus according to claim 4, wherein the power is corrected by changing a duty cycle of at least one pulse located between the first and second pulses.

7. An apparatus according to claim 2, further comprising a memory for storing information defining the power, wherein after the power has been corrected, information defining the corrected power is stored on the memory.

8. An apparatus according to claim 4, wherein after the information carrier has been loaded, the power and the widths of the first and second pulses are compensated for and then the power is corrected.

9. An apparatus according to claim 2, wherein the radiation beam with the corrected power is used only when some of the marks that are associated with the information to be written are formed to have a length equal to or greater than a predetermined length.

10. An apparatus according to claim 2, wherein the length of the test mark is equal to or greater than a length obtained by averaging a sum of maximum and minimum lengths of the multiple marks to be formed in writing the information.

11. An apparatus according to claim 2, wherein the length of the test mark is represented as 7T or more according to eight-to-sixteen modulation coding technique.

12. An apparatus according to claim 2, wherein the length of the test mark is represented as 11T according to eight-to-sixteen modulation coding technique.

13. An apparatus according to claim 2, wherein after the information carrier has been loaded, the power and the widths of the first and second pulses are compensated for by forming the test mark with a length represented as 6T or less according to eight-to-sixteen modulation coding technique, and then the power is corrected.

14. An apparatus according to claim 2, wherein the mark width comparator determines by jitters, which are caused at edges of the test mark and obtained from the read signal associated with the test mark, whether or not the test mark includes the read-error-inducing portion.

15. An apparatus according to claim 2, wherein the mark width comparator determines by a bit error rate, which is obtained by demodulating the read signal associated with the test mark, whether or not the test mark includes the read-error-inducing portion.

16. An apparatus according to claim 2, wherein the mark width comparator determines by an estimated mark length, which is obtained by demodulating the read signal associated with the test mark, whether or not the test mark includes the read-error-inducing portion.

17. An apparatus according to claim 2, wherein in the read-error-inducing portion, a level of the associated read signal is relatively low and the read signal is erroneously digitized as if a single test mark had two or more test marks.

18. An apparatus according to claim 2, wherein the information write means comprises:
    a radiation source driver for driving a radiation source emitting the radiation beam; and
    a write pulse generator, which is connected to the radiation source driver, generates the write pulses in accordance with information defining a waveform of the write pulses and applies the pulses to the radiation source driver.

19. An apparatus according to claim 18, wherein the long mark data generator makes the write pulse generator generate the write pulses for the test mark in accordance with information defining the write pulses for the test mark.

20. An apparatus according to claim 18, further comprising a nonvolatile memory on which the information defining the waveform of the write, pulses is stored.

21. An apparatus according to claim 18, further comprising a memory area in which information needed to define the corrected write pulses is stored.

22. An apparatus according to claim 2, wherein the information readout means comprises:
    an optical system for irradiating the information carrier with readout radiation;
    a photodetector for receiving part of the readout radiation that has been reflected from the information carrier and converting the radiation into an electrical signal; and
    a circuit for producing binary data based on a signal that has been received from the photodetector.

23. An apparatus A method for forming multiple marks, which are associated with information to be written, in an information layer of a rewritable information carrier by irradiating the information layer with a pulsed radiation beam such that optical characteristics of the information layer are locally changed,
    wherein a test recording operation is performed, the test recording operation comprising the steps of:
    a) writing at least one test mark in the information layer, the length of the test mark being equal to or greater than a preselected length;
    b) sensing a variation in the optical characteristics of part of the information layer where the test mark has been formed; and
    c) determining whether or not the test mark includes a read-error-inducing portion in which the optical characteristics have not changed sufficiently for reading out a signal associated with the test mark correctly, and
    wherein if it has been determined in the step c) that there is the read-error-inducing portion in the test mark, an average power of the radiation beam is increased from an initialized level in forming a mark with a length at least equal to that of the test mark.

24. An apparatus A method according to claim 23, wherein if it has been determined in the step c) that there is the read-error-inducing portion in the test mark, the test recording operation further comprises the step d) of forming another test mark in the information layer using the radiation beam with its average power increased from a certain level to a next level and then determining whether or not the test mark still includes the read-error-inducing portion, the step d) being performed at least once.

25. A method according to claim 23, wherein if it has been determined in the step c) that there is the read-error-inducing portion in the test mark, the test recording operation further comprises the step e) of forming N types of test marks (where N is an integer equal to or greater than 2) in the information layer using the radiation beams with their average power increased from a certain level to mutually different levels and then determining whether or not any of the test marks still includes the read-error-inducing portion, the step e) being performed at least once.

26. A method according to claim 23, wherein the test recording operation further comprises the step of compensating for the power of the radiation beam for a mark shorter in length than the test mark before the step a) is performed.

27. An apparatus for forming multiple marks, which are associated with information to be written, in an information layer of a rewritable information carrier by irradiating the information layer with a pulsed radiation beam such that optical characteristics of the information layer are locally changed, the apparatus comprising:
    a memory where information defining a pulse train, which will drive a source of the radiation beam, is stored;
    a write circuit for generating the pulse train in accordance with the information stored on the memory;
    a read circuit for reading out data associated with the marks that have been formed in the information layer; and
    a controller, connected to the write and read circuits, for controlling write and read operations,
    wherein the controller is programmed in such a manner as to perform the write and read operations for a mark with a length equal to or greater than a preselected length and to update the information stored on the memory such that the pulse train is optimized for the mark with the length.

* * * * *

UNITED STATES PATENT AND TRADEMARK OFFICE
CERTIFICATE OF CORRECTION

PATENT NO. : 6,611,481 B1  Page 1 of 1
DATED : August 26, 2002
INVENTOR(S) : Kenji Koishi et al.

It is certified that error appears in the above-identified patent and that said Letters Patent is hereby corrected as shown below:

Title page,
Item [56], References Cited, the fourth reference, should read as follows:
-- 5,636,942 A  9/1997  Ishibashi et al. --.

Column 19,
Line 60, delete "An Apparatus"

Column 20,
Line 19, delete "An Apparatus".

Signed and Sealed this

Seventeenth Day of February, 2004

JON W. DUDAS
*Acting Director of the United States Patent and Trademark Office*